K. HAZEN.
AMALGAMATOR.
No. 25,333.  Patented Sept. 6, 1859.
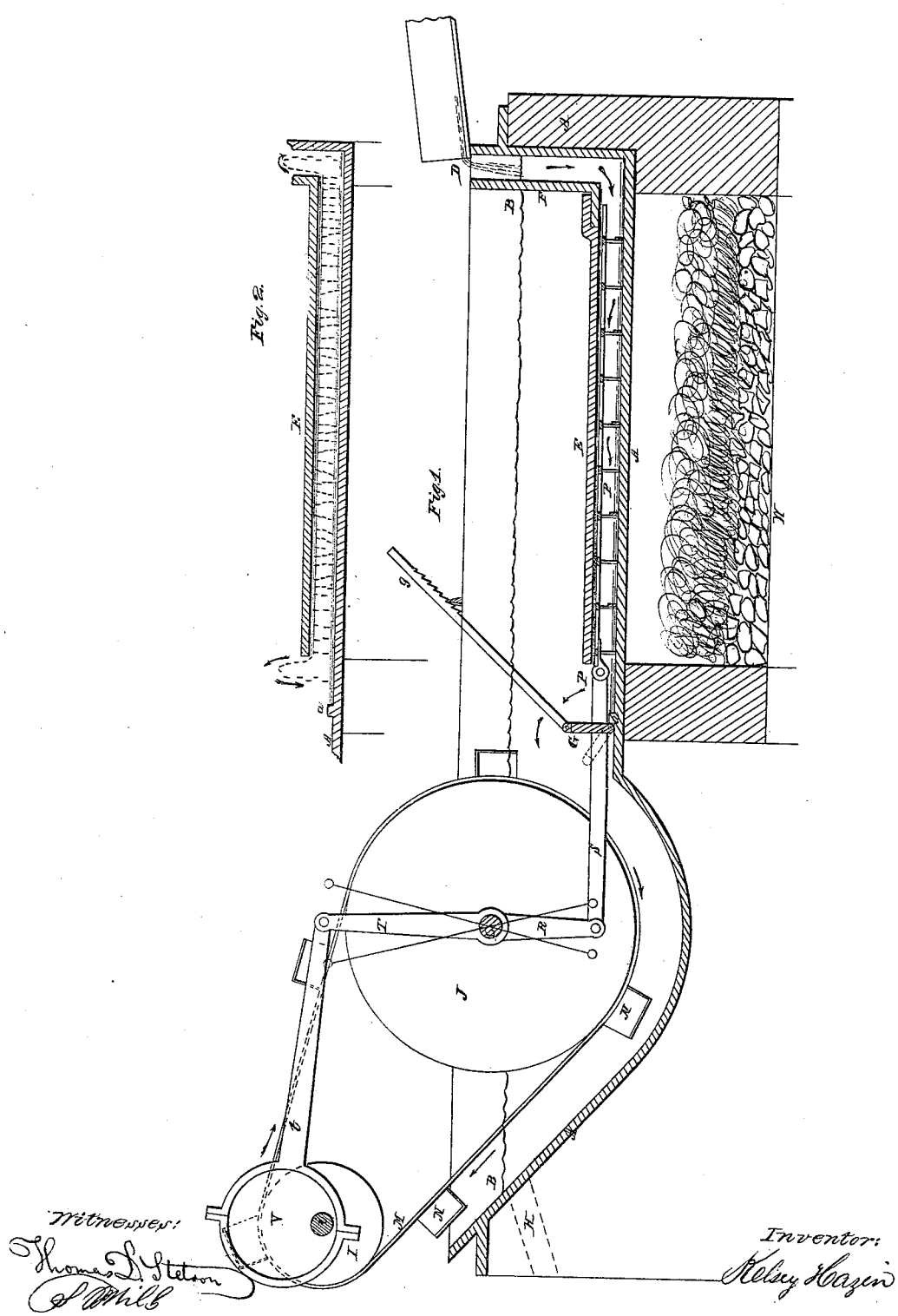

UNITED STATES PATENT OFFICE.

KELSEY HAZEN, OF BROOKLYN, NEW YORK.

AMALGAMATOR.

Specification of Letters Patent No. 25,333, dated September 6, 1859.

*To all whom it may concern:*

Be it known that I, KELSEY HAZEN, of the city, county, and State of New York, have invented a certain new and Improved Machine for Amalgamating Gold Which is Held in Suspension in Water; and I do hereby declare that the following is a full and exact description of the construction and operation of the same, reference being had to the accompanying drawings, and to the letters of reference marked thereon, in which—

Figure 1 is a vertical longitudinal section showing the construction and arrangement of the parts. And Fig. 2 is a duplicate section of a portion showing the motions of the fluids.

Similar letters of reference indicate corresponding parts.

Gold bearing rocks and earths are pulverized and washed in a great variety of machines, with all of which my invention has nothing to do. The disintegrated material leaves the several mills, crushers, shaking-tables, etc., mingled with or suspended in water. This compound of water and foreign matter is the material received by my machine, and which will throughout this description be designated by the simple term "water."

The perfection of the suspension of any solid particle in water depends not alone on its density but largely on its mass and form. A very minute sphere is much more perfectly suspended than a larger one of the same density in consequence of the greater surface—considered relatively to its mass—which is presented by the small particle for the adhesion of the water. A long and slender or broad and thin fragment is more perfectly suspended than a spherical one of equal magnitude for the same reason. It follows from these well known laws that although gold is more dense than the substances with which it is associated, many particles of gold are by reason of their small size or flaky form, or both causes combined, are so perfectly suspended in the water that gravity does not induce their descent unless the water remains quiescent for a considerable time, a longer period than can be afforded in practice by any mode of operating yet known. In consequence of this fact the gold which is thus perfectly suspended has been heretofore mostly lost and the amalgamating process has been mainly operative on the dense particles which despite the agitation of the water exhibit a decided tendency to sink to the bottom. My machine is on the contrary intended to uniformly expose to the mercury all the water and all the foreign particles suspended therein.

In the amalgamating machines in common use the mercury is agitated mechanically by stirring it with revolving wheels and the like. This is less efficient than the method invented by Messrs. Wyckoff and Fell in which the mercury is set in motion by heat applied beneath the vessel, and is by the agency of heat alone caused to move very rapidly and effectively through the water.

My invention is based on the property of mercury under such conditions to rise into the water. I have observed that although when heat is applied in sufficient intensity to the bottom of a vessel containing both mercury and water the mercury will be intensely agitated and will throw up many particles into the water which will speedily return again, the vertical space through which the particles rise is relatively small, and that consequently the operation of amalgamating by this process is inefficient except within only a very few inches above the surface of the mercury. It follows that, like most or all of the methods in which wheels and the like are employed, this method of amalgamating, as heretofore applied, operates most powerfully on the feebly suspended particles. Mere mechanical agitation in connection therewith can only partially overcome this evil, and it is obviously impracticable to reduce the depth of the water in order to allow the mercury to equally traverse every part because the intensely heated mercury would if allowed to reach the open surface of the water escape in the form of vapor with most serious results to all concerned.

The nature of my invention consists in compelling all the water to flow in such close proximity to the heated mercury that the whole is uniformly traversed by the mercurial particles, thereby exposing the most perfectly suspended particles of gold equally with the others to the amalgamating effect, and allowing the watery vapor freely to escape without allowing any quantity of the mercurial vapor to reach the surface of the water in the manner substantially shown below.

The nature of my invention also consists in employing agitators and scrapers acting in the space where the water is exposed to the double mercurial current above described, and an adjustable deflector for regulating the facility of the egress of the denser particles relatively to the lighter, all combined and arranged substantially in the manner shown in the drawings for the purpose of making the operation continuous without either wasting the gold by a too short retention nor diminishing the efficiency of the machine by a too long retention of any portion.

To enable others skilled in the art to construct and operate my invention, I will proceed to describe its construction and operation by the aid of the drawings.

A, A, A is the pan which may be made of cast or wrought iron and in various shapes, but I prefer the form represented, one portion having a plane and the remainder a curved or concave bottom. It is set in brickwork over a fire as represented. At the point D I introduce the water from stamps, crushers, shaking tables, concentrators or from any other process of working gold.

E is a horizontal plate which is removable to allow access to the space below, which space is a very few inches in depth but of a length and breadth as great as may be desired.

F is a vertical plate which compells all the water admitted at D to flow under E. The plate E extends transversely quite across the pan and all the water is compelled to travel beneath it throughout its whole extent.

I make a shallow ridge across the bed plate as represented. I deposit my mercury upon the flat bed forming a stratum thereof as shown by the lower blue line. The water is heated before its admission to the machine as will be explained below. On passing it gradually through the space beneath E and making an active fire on the grate W large quantities of the mercury are continuously and rapidly thrown up against the plate E and again rapidly descend, while steam alone appears at the surface of the water B, B. The theory of this phenomenon I believe to be as follows:—

The temperature of the water is 212° Fah. and it of course tends to reduce the mercury to the same temperature. But when a sufficient intensity of heat is imparted to A by the fire beneath it the mercury receives heat faster than it can while in a quiescent state convey it to the water above. Its temperature consequently rises and ultimately those particles in direct contact with A becoming heated to 662° Fah. assume the vaporous form and rise into the water. The plate E is at so slight an elevation that little of this mercurial vapor is condensed until it reaches the vicinity of its under surface where it spreads out and receiving constant accessions from below tends to form a stratum of mercurial vapor. The vapor of water being lighter than that of mercury lies in a thin stratum in immediate contact with the plate E, the mercurial vapor lies immediately underneath it, greatly agitated; receiving globules of vapor from below and as constantly showering down globules of mercury. The effect is to operate with great efficiency, taking up and amalgamating the loose floating gold from the water; which it has been almost impossible heretofore to save, as well as liberating and amalgamating from most earthy substances containing gold. The watery vapor or steam raised by the process escapes freely from the edges of the plate E as also does a portion of the mercurial vapor but while the former rises through the water and escapes into the atmosphere the latter is certain to be mostly condensed before reaching the surface and to fall in paths denoted by the dotted lines and red arrows in Fig. 2. The depth of the water above the plate E must be such that the mercury is certain to be condensed before reaching the surface, except a very small quantity which may remain for a time suspended in the water. It is obvious that the depth may be increased to any extent desired by reducing the rate of its discharge and if necessary providing a suitable rim around the edge of A.

I mount an adjustable gate or plate G extending across the bed as represented. To this I attach a rod $g$ having several notches along its length, or provide equivalent means by the aid of which I elevate and depress G at pleasure or adjust it permanently at such elevation as I may desire. The water after flowing along beneath the plate E is compelled to rise to pass over the plate G and the water above E must always be kept of such depth as to allow it to rise without difficulty, and with a very inconsiderable velocity. The lowest level of the water is denoted by the wavy line B, B, in Fig. 2. The least perfectly suspended particles tend by their gravity to remain rather than to rise and flow over the adjustable plate G. Elevating the plate G tends to induce an accumulation of such upon the mercury and depressing it allows them to wash away more freely. Through its agency the heavier particles remain in longer contact with the mercury than do the lighter particles and this is usually desirable but when the tendency to accumulate becomes too great it is checked by lowering G to a sufficient extent or if preferred the mud is allowed to escape entirely at intervals by temporarily depressing G to its fullest extent. The concave portion of A I remove the water and earthy matter by allowing it to flow out at the front represented by dotted lines at H or by scoops which will now be described.

I is a pulley of any suitable form which is firmly fixed on the shaft $i$ which latter is rotated by a steam engine or any suitable power. J is a corresponding pulley loosely mounted on the rocking shaft L. Both $i$ and L are mounted in fixed bearings as represented. M is a belt or chain of any suitable material passing around I and J. To it are attached scoops or elevators N each of which has a valved bottom not represented through which its contents may be dropped. The belt moves as shown by the arrows and the scoops N are alternately filled and carried above the surface of the water and beyond the edges of A where they are opened by any suitable mechanism not represented and allowed to discharge their contents. These scoops may be made to elevate the water to any height desired and they become important in connection with the transfer of heat from the escaping to the inflowing water which is to be described below. They are also of service in agitating the water in the deep portion of the pan and thus removing the earthy particles instead of allowing them to settle, while the particles of mercury which chance to reach this portion sink into the bottom of the concave and may be recovered at any time.

In order to mechanically aid in the agitation of the mercury and of the water beneath the plate E I provide a frame P with teeth or equivalent parts to agitate the flow of the water. I connect this frame by two hooks S S to the lower arm R of the shaft L one of which arms R is mounted on each side of the pulley J. To the upper arm T of this shaft L I connect a rod $t$ as represented which by means of the cranks or eccentric V on the shaft I is caused to rock the lever T and consequently to give a reciprocating motion to the frame P. Narrow scrapers are attached to the teeth on P so as to extend across the bottom of the pan A and these are placed at such intervals that the vibrations of the shaft L induce a thorough and continual scraping of the whole heated surface of A. This prevents the earth from adhering by any chance to the metal of A and distributes the flow of the water very uniformly.

In order to economize fuel I transfer a large portion of the heat of the water from the exit end H of the machine to the water entering at the opposite end, by conveying it in pipes or channels not represented, and allowing the heat of the escaping water to be transmitted through the metal by any ordinary arrangement. I prefer to lead the hot water through the cold water in one or more thin pipes. They must be so arranged as to allow of their being conveniently cleansed. I propose also to use all the steam or vapor rising from the water in the pan A to heat the water before its entrance therein. I also propose thus to use all exhaust steam from the steam engine when one is worked in connection or within any small distance so as to insure a high temperature of the water before its entrance under the plate E. The heat of the steam may be transferred to the water by any of the ordinary and well known arrangements not represented, but I prefer to expose the naked surface of the water to the steam in a close vessel. By these means the amount of fuel required to be burned in the furnace is greatly reduced and the operation is conducted rapidly and at a small cost.

I wish it understood that I am aware of the several patents issued to Messrs. John N. Wyckoff and Thomas M. Fell on the twentieth of July 1859 and that I do not claim as my invention anything therein shown or described but—

Having now fully described my improved amalgamator and its mode of operation what I claim as new therein and desire to secure by Letters Patent is—

1. Compelling the water having the particles of gold in suspension to flow within a certain small distance of the heated mercury under conditions substantially as herein set forth.

2. I also claim in connection with the above the employment of a series of vibrating agitations and scrapers P acting in the space under E and of an adjustable gate G for regulating the facility of egress of the least perfectly suspended particles when combined and arranged substantially as and for the purposes herein set forth.

In testimony whereof I have hereunto set my name and seal.

KELSEY HAZEN. [L. S.]

Witnesses:
THOMAS D. STETSON,
V. S. MILLS.